US009511577B2

(12) United States Patent
Nagasaka et al.

(10) Patent No.: US 9,511,577 B2
(45) Date of Patent: Dec. 6, 2016

(54) TRANSPORT SYSTEM, TRANSPORT METHOD, AND APPARATUS FOR MANUFACTURING BONDED LAMINATED MATERIAL USING THE TRANSPORT SYSTEM

(75) Inventors: Masahiko Nagasaka, Shinshiro (JP); Shogo Nakajima, Shinshiro (JP); Takayuki Nozawa, Shinshiro (JP); Osamu Sugino, Shinshiro (JP); Ikuto Mishima, Toyokawa (JP)

(73) Assignee: SINTOKOGIO, LTD., Nagoya-Shi, Aichi (JP)

( * ) Notice: Subject to any disclaimer, the term of this patent is extended or adjusted under 35 U.S.C. 154(b) by 381 days.

(21) Appl. No.: 14/360,486

(22) PCT Filed: May 14, 2012

(86) PCT No.: PCT/JP2012/062271
§ 371 (c)(1),
(2), (4) Date: May 23, 2014

(87) PCT Pub. No.: WO2013/080581
PCT Pub. Date: Jun. 6, 2013

(65) Prior Publication Data
US 2014/0301808 A1    Oct. 9, 2014

(30) Foreign Application Priority Data
Nov. 28, 2011    (JP) ................. 2011-258884

(51) Int. Cl.
*B32B 37/00*    (2006.01)
*B32B 38/18*    (2006.01)
(Continued)

(52) U.S. Cl.
CPC ...... *B32B 38/1858* (2013.01); *B29C 66/00145* (2013.01); *B32B 38/18* (2013.01);
(Continued)

(58) Field of Classification Search
CPC ............ B32B 38/1858; B32B 37/1018; B32B 2309/68; B29C 66/00145
See application file for complete search history.

(56) References Cited

U.S. PATENT DOCUMENTS 7,267,151 B2* 9/2007 Kubota ................. B32B 37/10
156/358

FOREIGN PATENT DOCUMENTS

JP    2000-182014    6/2000
JP    2002-011780    1/2002
(Continued)

OTHER PUBLICATIONS

English-language International Search Report from the Japanese Patent Office for International Application No. PCT/JP2012/062271, mailing date Jul. 31, 2012.

*Primary Examiner* — John Goff
(74) *Attorney, Agent, or Firm* — Finnegan, Henderson, Farabow, Garrett & Dunner, L.L.P.

(57) ABSTRACT

The present invention provides a transport system for a jig for fixing material to be laminated, which system can transport a jig for fixing material to be laminated using a simple exhaust device that is of a space-saving-type while it continuously exhausts air, a transport method for transporting a jig for fixing material to be laminated, and an apparatus for manufacturing bonded laminated material comprising the transport system.

10 Claims, 12 Drawing Sheets

(51) Int. Cl.
*B29C 65/00* (2006.01)
*H01M 8/10* (2016.01)

(52) U.S. Cl.
CPC ......... *H01M 8/1004* (2013.01); *Y02E 60/521* (2013.01); *Y02P 70/56* (2015.11)

(56) References Cited

FOREIGN PATENT DOCUMENTS

| | | |
|---|---|---|
| JP | 2005-019275 | 1/2005 |
| JP | 2008-146833 | 6/2008 |
| JP | 2008-159377 | 7/2008 |
| JP | 2009-290012 | 12/2009 |
| JP | 2010-012786 | 1/2010 |
| JP | 2010-062468 | 3/2010 |

\* cited by examiner (A)

(B)

(A)

(B)

(A)

(B)

(A)

(B)

(A)

(B)

(A)

(B)

(A)

(B)

TRANSPORT SYSTEM, TRANSPORT METHOD, AND APPARATUS FOR MANUFACTURING BONDED LAMINATED MATERIAL USING THE TRANSPORT SYSTEM

FIELD OF THE INVENTION

The present invention relates to a transport system for a jig for fixing material to be laminated that is used for manufacturing bonded laminated material, such as a membrane-electrode assembly for a polymer electrolyte fuel cell, by first laminating membrane material and then pressuring and bonding them. It also relates to a transport method for transporting the jig for fixing material to be laminated and to an apparatus for manufacturing bonded laminated material that uses the transport system.

TECHNICAL BACKGROUND

Conventionally, a method for pressurized bonding has been used to manufacture bonded laminated material by pressurizing and bonding material that is made from laminated membranes that are transported into opposing parts of a pressurizing device for pressurized bonding. This technology also has recently been used for manufacturing a membrane-electrode assembly (hereafter, "MEA") for a polymer electrolyte fuel cell, which assembly is manufactured by laminating and bonding solid polymer membranes, fuel electrode membranes, and air electrode membranes.

To manufacture the bonded laminated material by the above method, a method for fixing material to be laminated is proposed wherein 1) the material to be laminated is placed on a flexible sheet that is attached to a metal frame for fixing the sheet, 2) another frame for fixing the sheet, the frame having a flexible sheet and an annular packing, is placed over the metal frame for fixing the sheet, and 3) air is discharged from a sealed chamber that is formed by these elements given above to depressurize the chamber and to fix the bonded material (for example, Patent documents 1 and 2).

Also, to transport the jig that fixes the material to be laminated while keeping the inside of the jig under depressurized conditions by suctioning and to continuously pressurize it are proposed (for example, Patent documents 3-5). Also, a roller-type press is proposed as a pressurizing device (Patent document 6).

RELATED ART

Patent Documents

Patent document 1: Publication of Japanese patent application, Publication No. 2005-19275
Patent document 2: Publication of Japanese patent application, Publication No. 2008-146833
Patent document 3: Publication of Japanese patent application, Publication No. 2000-182014
Patent document 4: Publication of Japanese patent application, Publication No. 2009-290012
Patent document 5: Publication of Japanese patent application, Publication No. 2010-62468
Patent document 6: Publication of Japanese patent application, Publication No. 2002-11780

SUMMARY OF THE INVENTION

Problem to be Solved by the Invention

However, about the inventions of Patent documents 1 and 2, since the frames for fixing a sheet surround all the circumference of the material to be laminated and are thicker than the material to be laminated, a method for pressurized bonding by a device for continuous pressing, such as a roller-type press or a double-belt-type press, which is suitable for mass-production, and where the material is pressed while it is transported in a straight line, is not applicable. Thus there is a problem in that the bonded laminated material cannot be efficiently manufactured.

Also, in the inventions of Patent documents 3-5, a rotating turntable is used for transporting the jig for fixing material to be laminated where a processing unit such as a pressing mechanism is disposed around the turntable circumference concentrically with respect to the turntable axis. So, if a process includes various steps such as by further adding a pressing step, the size of the turntable becomes larger. This is because the circumference of the turntable must be designed to be longer. Thus there is a problem in that a large dead space is created inside the circumference of the turntable.

In the invention of Patent document 6, a roller-type press is adopted where the press presses the material while transporting the material in a straight line. However, equipment as a whole is constructed as a vacuum chamber. So, there is a problem in that it requires a costly exhaust device.

Thus the object of the present invention is to provide a transport system for a jig for fixing material to be laminated, a transport method, and an apparatus for manufacturing bonded laminated material that uses the transport system, wherein the transport system can transport a jig for fixing material to be laminated using a simple exhaust device that is of a space-saving-type and continuously exhausts while the transport system transports the jig.

Problem to be Solved by the Invention

To achieve the above object, the first invention is directed to a transport system of an apparatus for manufacturing bonded laminated material where the material to be laminated made of laminated membranes is pressurized by means of a pressuring device, and the transport system transports a jig for fixing material to be laminated that fixes the material to be laminated, comprising:
 an exhaust device that can be connected to the jig for fixing material to be laminated;
 a transporting device comprising:
  a shuttle that carries the jig for fixing material to be laminated;
  a slider that causes the shuttle to make a reciprocating movement in a transporting direction;
  a driving device that drives the slider; and
  an intermediate table that receives the jig for fixing material to be laminated from the shuttle and holds the jig on it;
 wherein the jig for fixing material to be laminated comprises:
  a housing space that can house the material to be laminated;
  an exhaust passage that is formed to be connected to the housing space;

a first exhaust port and a second exhaust port that can alternately be switched to the exhaust passage that connects the housing space and the exhaust device;

wherein when the material to be laminated is disposed in the housing space and the space is exhausted by the exhaust device, the jig for fixing material to be laminated fixes the material to be laminated within the housing space;

wherein the shuttle comprises a first exhaust connector that exhausts the housing space by means of the exhaust device and by being connected to the first exhaust port when the jig for fixing material to be laminated is loaded on the shuttle;

wherein the intermediate table comprises a second exhaust connector that exhausts the housing space by means of the exhaust device and that is connected to the second exhaust port when the jig for fixing material to be laminated is loaded on the intermediate table; and wherein the transporting device transports the jig for fixing material to be laminated toward the pressurizing device while the jig for fixing material to be laminated is placed on the shuttle and the housing space is being exhausted by means of the first exhaust connector, and then transfers the jig for fixing material to be laminated to the intermediate table of the transporting device, which intermediate table is disposed downstream in the direction of the transport, whereupon on the intermediate table, after the second exhaust connector is connected to the second exhaust port, the housing space is exhausted by the exhaust device by the exhaust passage being switched to the second exhaust port, such that the jig for fixing material to be laminated is transported while the housing space for the jig for fixing material to be laminated is kept to be in an exhausted condition.

In the first invention, the jig for fixing material to be laminated can be transferred to the intermediate table of the transporting device under the condition that the jig for fixing material to be laminated is loaded on the shuttle of the transporting device while the housing space where the material to be laminated is placed is continuously exhausted by the exhaust device and the exhausted condition is being maintained.

In this way a transport system that does not require much space and that can transport the jig for fixing material to be laminated while it continuously exhausts the housing space that houses the jig for fixing material to be laminated can be provided. For example, if a transporting device that transports the jig for fixing material to be laminated in a straight line is adopted, each manufacturing step can be arranged in a straight line. So, a dead space that could not be avoided if a rotating turntable were adopted would not occur. Also, a simple exhaust device can be used, such that the transport system does not need any costly exhaust device having a large capacity.

In the second invention, the transport system of the first invention uses a technical means wherein the pressurizing device comprises a plurality of pressurizing parts, which parts pressurize the material to be laminated that is fixed to the jig for fixing material to be laminated, a shuttle and an intermediate table are provided corresponding to each of the plurality of pressurizing parts; and a plurality of the shuttles of the transporting device are arranged to operate in a coordinated movement; the transporting device receives the jig for fixing material to be laminated that is disposed on the intermediate table and transfers it to the shuttle, transports it while the housing space is maintained being exhausted by the first exhaust connector, and then transfers it to the adjacent intermediate table that is positioned on the downstream side.

By using the pressurizing device that has a plurality of pressurizing parts, the transport system of the second invention receives the jig for fixing material to be laminated that is disposed on the intermediate table on the upstream side and transfers it to the shuttle, which then carries it on to the intermediate table that is positioned downstream. By repeating this movement, the transport system can transport the jig for fixing material to be laminated continuously and can also continuously pressurize the material to be laminated. In this way, a bonded laminated material can be manufactured efficiently.

In the third invention, the transport system of the first or second invention uses a technical means wherein the pressurizing device pressurizes an object to be pressurized while it transports the object in a straight line, wherein the transport system uses the jig for fixing material to be laminated that can pressurize the object and transport it in a straight line and wherein pressurizing the jig for fixing material to be laminated is carried out while the jig for fixing material to be laminated is being transported by the transporting device.

As in the third invention, the transport system can use the jig for fixing material to be laminated that can pressurize the object and transport it in a straight line as a jig for fixing material to be laminated and can use a pressurizing device that can pressurize an object to be pressurized while it transports the object in a straight line, such as in a roller-type press or a double-belt-type press. In this way, pressurizing the jig for fixing material to be laminated can be carried out while the transporting device transports the jig for fixing material to be laminated, so that the bonded laminated material can be manufactured efficiently.

In the fourth invention, the transporting device of the transport system of the third invention uses a technical means wherein while the jig for fixing material to be laminated is pressurized by the pressurizing device, the transporting device transports the jig for fixing material to be laminated at a speed that corresponds to the feeding speed of the pressurizing device.

In the fourth invention, the transporting device of the transport system of the third invention transports the jig for fixing material to be laminated at a speed that corresponds to the feeding speed of the pressurizing device while the jig for fixing material to be laminated is pressurized by the pressurizing device. So, the friction between the jig for fixing material to be laminated and the pressurizing device can be reduced, which causes the jig for fixing material to be laminated and the pressurizing device to have longer lives. Also, the material to be laminated is not likely to be subject to an excessive force. So, a bonded laminated material of high quality can be manufactured.

In the fifth invention, the transporting device of the transport system of the first or second invention uses a technical means wherein at least either a crank-slider transporting device or the intermediate table, of the transporting device, has a lifting device, where the jig for fixing material to be laminated is transferred by the movement of either the crank-slider transporting device or the intermediate table that goes up or down relatively to the other in relation to the base of the surface of the jig for fixing material to be laminated that is pressurized by the pressurizing device.

In the fifth invention, transferring the jig for fixing material to be laminated is carried out by the movement of either the crank-slider transporting device or the intermediate table that goes up or down relatively to the other on the base of the surface of the jig for fixing material to be laminated that is pressurized by the pressurizing device. So, transferring the jig for fixing material to be laminated can be securely carried out.

In the sixth invention, the first exhaust port and the second exhaust port of the transport system of any of the first to fifth inventions use a technical means wherein they each comprise a check valve that prevents outside air from flowing back into the housing space.

In the sixth invention, the first exhaust port and the second exhaust port each have the check valve, so that the flowing back of the outside air into the housing space, which would hinder the jig for fixing material to be laminated in the housing space from being in the exhausted state, can be prevented.

In the seventh invention, the slider of the transport system of any of the first to sixth inventions uses a technical means wherein it comprises a crank-arm, one end of which is connected to a driving device that makes a rotating movement and which crank-arm can rotate, and a link, one end of which is connected to the other end of the crank-arm in a way that both ends can rotate, and a guide rail that guides, in the direction of the transport, the shuttle to move, the other end of which is connected to the other end of the link that moves the shuttle back and forth.

By having the slider of the transport system have the constitution as in the seventh invention, the transporting device can be simplified and does not occupy much space.

In the eighth invention, the transport system of the seventh invention uses a technical means where the transporting speed of the jig for fixing material to be laminated that is transported by the transporting device is controlled based on the angular velocity that is calculated, of the angle of the crank-arm that rotates.

In the eighth invention, by using the transport system having the constitution of the seventh invention, the transporting speed of the jig for fixing material to be laminated that is transported by the transporting device can be highly and accurately controlled based on the angular velocity that is calculated, of the angle of the crank-arm that rotates.

In the ninth invention, the apparatus for manufacturing bonded laminated material uses a technical means where it comprises a transport system of any one of the first to eighth inventions.

In the ninth invention, by using the transport system of any one of the first to eighth inventions the apparatus for manufacturing bonded laminated material can transport the jig for fixing material to be laminated while it continuously exhausts the housing space where the jig for fixing material to be laminated is disposed. For example, if the transporting device of the transport system that transports the jig for fixing material to be laminated in a straight line is adopted, a layout for each manufacturing step can be arranged in a straight line. So, the dead space that could not be avoided in case of the rotating turntable would not occur. Thus the apparatus for manufacturing bonded laminated materials can be compact.

Also, a simple exhaust device can be used, so that no costly exhaust means having a large capacity is required.

The tenth invention uses a technical means wherein a transport method for transporting a jig for fixing material to be laminated for an apparatus for manufacturing bonded laminated material that manufactures the bonded laminated material by pressurizing material to be laminated made of laminated membranes by means of a pressurizing device transports the jig for fixing material to be laminated that fixes the material to be laminated, wherein the method uses:
an exhaust device that can be connected to the jig for fixing material to be laminated;
a transporting device comprising:
    a shuttle that carries the jig for fixing material to be laminated;
    a slider that causes the shuttle to make a reciprocating movement along a transporting direction;
    a driving device that drives the slider;
    an intermediate table that receives the jig for fixing material to be laminated from the shuttle and holds it;
wherein the jig for fixing material to be laminated comprise:
    a housing space that can house material to be laminated;
    an exhaust passage that is connected to the housing space;
    a first exhaust port and a second exhaust port that can alternately be switched to the exhaust passage that connects the housing space and the exhaust device;
wherein, when the material to be laminated is disposed in the housing space and the space is exhausted by the exhaust device, the jig for fixing material to be laminated fixes the material to be laminated to the housing space;
wherein the method comprises the steps of:
    transporting the jig for fixing material to be laminated from the upstream side of the pressurizing device toward the pressurizing device while the housing space is in the state of being exhausted by means of the first exhaust port; and
    transferring the jig for fixing material to be laminated that was transported to the intermediate table of the transporting device, which intermediate table is downstream in the direction of the transport, and exhausting the housing space by means of the second exhaust port after the connection of the exhaust passage on the intermediate table is switched to the second exhaust port.

In the tenth invention, the jig for fixing material to be laminateds can be transferred to the intermediate table while the jig for fixing material to be laminated is kept on the shuttle of the transporting device and in the housing space where the material to be laminated that is placed is continuously exhausted by the exhaust device and the exhausted state is maintained.

In this way the transport system of the transport method can transport a jig for fixing material to be laminated, for example, in a straight line while the housing space where the material to be laminated is placed is continuously exhausted. If a transporting device that transports a jig for fixing material to be laminated in a straight line is adopted, a layout for each manufacturing step can be arranged in a straight line. So, a dead space that could not be avoided as in case of a rotating turntable would not occur. Also, a simple exhaust device can be used, such that no costly exhaust means having a large capacity is required.

The eleventh invention, further to the transport method of the tenth invention, uses a technical means where if the pressurizing device pressurizes an object while it transports the object in a straight line, the method comprises further a step where the transporting device transports the jig for fixing material to be laminated at a speed that corresponds to the feeding speed of the pressurizing device while the jig for fixing material to be laminated is pressurized by the pressurizing device.

In the eleventh invention, the jig for fixing material to be laminated is transported at a speed that corresponds to the feeding speed of the pressurizing device while the jig for fixing material to be laminated is pressurized by the pressurizing device. So, a force of friction that works between the jig for fixing material to be laminated and the pressurizing device can be reduced, which makes the jig for fixing material to be laminated and the pressurizing device have longer lives. Also, the material to be laminated is not likely to be subject to excessive force. So, a bonded laminated material of high quality can be manufactured.

BRIEF DESCRIPTION OF DRAWINGS

FIG. 2(A) is a plan view of the first fixing member and the sealing member. FIG. 2(B) is a plan view of the second fixing member.

FIG. 4(A) is a sectional view shown by arrows A-A in FIG. 3. FIG. 4(B) is a sectional view shown by arrows B-B in FIG. 3.

FIG. 5(A) is a sectional view shown by arrows C-C in FIG. 3. FIG. 5(B) is a sectional view shown by arrows D-D in FIG. 3.

FIG. 6(A) gives a perspective view and FIG. 6(B) gives a plan view.

FIG. 7(A) gives an enlarged perspective view of a part of, and around, the crank-slider transporting device. FIG. 7(B) is an enlarged perspective view of a part of, and around, the shuttle, and the intermediate table, of the crank-slider transporting device.

FIG. 8(A) is an illustrative perspective view and FIG. 8(B) is a plan view.

FIG. 9(A) is an illustrative perspective view and FIG. 9(B) is a plan view.

FIG. 10(A) is an illustrative side view. FIG. 10(B) is an illustrative sectional view shown by arrows A-A in FIG. 10(A).

FIG. 11(A) is an illustrative perspective view and FIG. 11(B) is an illustrative plan view.

EMBODIMENT TO CARRY OUT THE INVENTION

Figure 1:
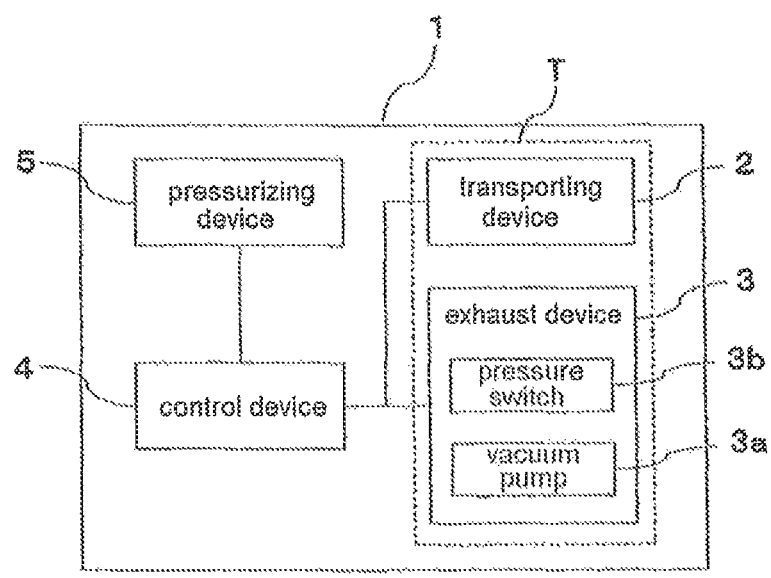
FIG. 1 is a block diagram showing the formation of the apparatus for manufacturing bonded laminated material that uses the transport system of the present invention.
Figure 2:
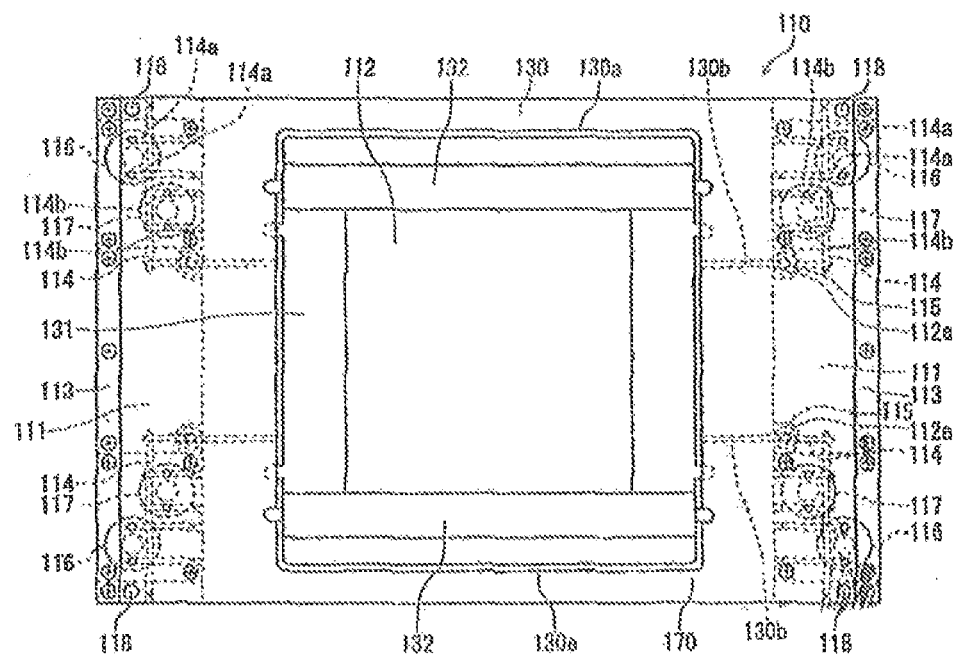
FIG. 2 is a view showing the structure of the jig for fixing material to be laminated.
Figure 2:
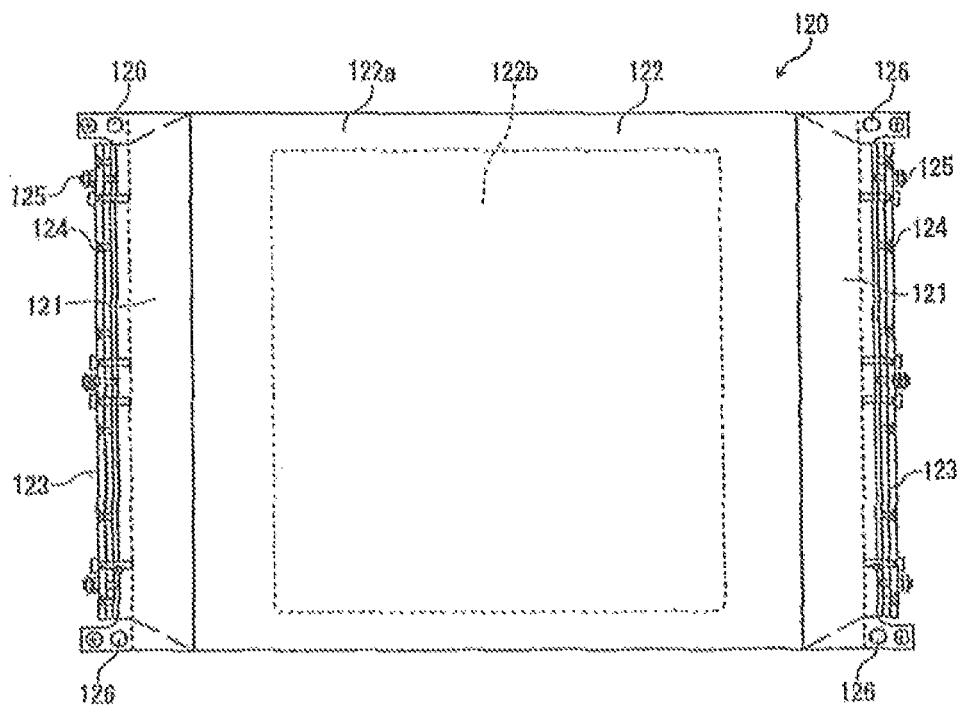

The present invention is explained below by reference to the drawings. As shown in FIG. 1, the apparatus for manufacturing bonded laminated material 1 that manufactures the bonded laminated material by pressurized bonding of the material to be laminated by means of the pressurizing device, using the jig for fixing material to be laminated that fixes the material to be laminated that is made of the membrane material, comprises:

a pressurizing device 5 that continuously pressurizes an object to be pressurized while transporting the object in a straight line and in one direction;

a transporting device 2 that transports the jig for fixing material to be laminated to the pressurizing device 5 and carries it out from the pressurizing device 5;

an exhaust device 3 that exhausts a housing space for the jig for fixing material to be laminated, which housing space is to be explained later; and a control device 4 that controls the pressurizing device 5, the transporting device 2, and the exhaust device 3.

In the present embodiment, the transport system T that is made up of the transporting device 2 and the exhaust device 3 transports the jig for fixing material to be laminated in a straight line. Examples of the bonded laminated material comprise a membrane-electrode assembly (MEA) for a polymer electrolyte fuel cell, which is manufactured by laminating a solid polymer membrane, a fuel electrode membrane, and an air electrode membrane, and bonding them.

The pressurizing device 5 continuously pressurizes an object to be pressurized while transporting the object in a straight line and in one direction and in the present embodiment a roller-type press is used. Also, a double-belt-type press that can move the object forward in a straight line can be used as a pressurizing device 5.

The exhaust device 3 comprises a vacuum pump 3a and a pressure switch 3b that measures the degree of the vacuum and detects whether the jig for fixing material to be laminated is loaded.

The control device 4 controls the pressurizing device 5, the transporting device 2, and the exhaust device 3, based on pressure conditions such as the pressure, the temperature for pressurizing, and the feeding speed, on the pressure in the housing space, and on the signal of a proximity sensor 13c (Fig (B)), which will be explained later.

One example of the jig for fixing material to be laminated is explained in reference to FIGS. 2 to 5. The jig for fixing material to be laminated 100 comprises a first fixing member 110 that is connected to the exhaust device 3 by means of the shuttle 13 and the intermediate table 20; and a second fixing member 120 that is used in combination with the first fixing member 110, and the sealing member 130.

The first fixing member 110 is made of first pillar members 111 that are placed roughly in parallel to the direction of the transport to the pressurizing device 5 and a first sheet-member 112 that is made of a flexible band-like member and that extends between the first pillar members 111, 111. The first sheet-member 112 is, for example, made of a metallic material such as stainless steel.

The end part of the first sheet-member 112 is fastened together with the end part of the first sealing member 130 by means of the first holding member 113 to one of the surfaces (FIG. 4(A)) of the first pillar member 111, along the longitudinal direction of the first pillar member 111.

In the area where the first sheet-member 112 contacts the first pillar-member 111, an exhaust hole 112a that pierces the first pillar-member 112 is provided at the position where an exhaust passage 114 opens. The exhaust hole 112a communicates with the exhaust passage 114 via a vacuum pad 115.

The exhaust passage 114 is connected to a vacuum pump 3a and formed on the first pillar-member 111 so that it communicates with the housing space S, which is explained later. The exhaust passage 114 is divided in the middle into a first exhaust passage 114a and a second exhaust passage 114b. The first exhaust passage 114a communicates with a communicating part 116d (FIG. 12) of the first exhaust port 116 that is positioned outwardly and the second exhaust passage 114b communicates with a communicating part 117d of the second exhaust port 117.

As shown in FIG. 4(A), the second exhaust port 117 comprises within the communicating part 117d a check valve 117a that prevents external air flowing back into the housing space S, a sealing member 117b that is disposed below the check valve 117a and that opens and closes the opening of the second exhaust passage 114b, through which opening the second exhaust passage 114b communicates with the communicating part 117d, and a spring 117c that biases the check valve 117a in such a direction that a sealing member 117b closes the opening (the downward direction in FIG. 4(A)).

In the second exhaust port 117, normally the communicating part 117d does not communicate with the second exhaust passage 114b by means of the check valve 117a. When the check valve 117a is pushed up by a second exhaust connector 20b, which is explained later, the opening of the second exhaust passage 114b that is closed by the sealing member 117b is opened. Then the communicating part 117d communicates with the second exhaust passage 114b. In this way the housing space S communicates with the second exhaust port 117 and the air can be exhausted from the housing space S.

The first exhaust port 116 has the same constitution as the second exhaust port 117, so that the air can be exhausted through either one of the branched passages (the first exhaust passage 114a and a second exhaust passage 114b) of the exhaust passage 114 that communicates with the housing space S. The first exhaust port 116 and the second exhaust port 117 have the check valve 116a and the check valve 117b, respectively. So, the external air does not flow back into the housing space S, such that the jig for fixing material to be laminated 100 is prevented from being in an unexhausted state.

The first pillar-member 111 comprises a positioning pin 118 that determines the position of a second pillar-member 121 that is disposed to be opposite the first pillar-member 111.

The second fixing member 120 has a second sheet-member 122 that is made of a flexible band-like member and that extends between the second pillar-members 121, 121 that are disposed to be opposing the respective first pillar-members 111. The outside shape of the second sheet-member 122 that extends between the second pillar-members 121, 121 is formed so that it is more or less the same as that of the first sheet-member 112 that extends between the first pillar-members 111, 111.

The second sheet-member 122 is made of (1) the flexible sheet-member 122a, that is made of Teflon (registered trademark), which is reinforced by glass fibers that are flexible resin material and that are treated to be antistatic and made of (2) stiffness-increasing material 122b that is made from material that is harder than the flexible sheet-member 122a and is flexible and that is formed into a plate-like member of a rectangular shape. The stiffness-increasing material 122b is combined with the flexible sheet-member 122a and forms the second sheet-member 122 as one piece.

The stiffness-increasing material 122b is positioned on the side of the material to be laminated W when the first fixing member 110 and the second fixing member 120 are combined, thereby disposing the material to be laminated W to the position where the material to be laminated W can be pressurized. The stiffness-increasing material 122b is formed so that its dimensions are greater than those of the material to be laminated W, but does not exceed the outer shape of the housing space-forming part 131. By forming the stiffness-increasing material 122b to those dimensions, the jig for fixing material to be laminated can securely fix the material to be laminated W and can pressurize it uniformly. At the same time the second sheet-member 122 is attached tightly to the sealing member 130, so that the housing space S can be securely sealed. In the present embodiment the stiffness-increasing material 122b has nearly the same size as the outer shape of the housing space-forming part 131.

The second sheet-member 122 is folded along the side of the second pillar-members 121 and fixed by the second holding members 123 along the side of the second sheet-member 122. The second holding member 123 comprises a fixing screw 124 that fixes the second sheet-member 122 and an adjusting screw 125 that adjusts the position of the second holding member 123.

The second holding member 123 has positioning holes 126 pierced, which holes determine the position of the second fixing member 120 by the positioning pins 118 of the first fixing member 120 being inserted into them.

The sealing member 130 is placed between the first sheet-member 112 and the second sheet-member 122, both of which are positioned to oppose each other by the first pillar-members 111, 111 and the second pillar-members 121, 121. The sealing member 130 comprises a housing part 130a that is the space to house the material to be laminated W and that is formed by the first sheet-member 112 and the second sheet-member 122 that are opposed to each other, and an exhaust part 130b that communicates with the housing part 130a and that exhausts that housing space S that is formed by the first sheet-member 112, the second sheet-member 122, and the housing space-forming parts 131, and that is closed. The sealing member 130 is sandwiched by the first sheet-member 112 and the second sheet-member 122, thereby functioning as side walls.

The exhaust part 130b communicates with the housing part 130a, protrudes toward the first pillar-member 111, and faces the exhaust hole 112a of the first sheet-member 112. Also, the exhaust part 130b is made smaller than the housing part 130a so that the material to be laminated W housed in the housing part 130a does not move to the exhaust part 130b.

In the housing part 130a of the first sheet-member 112 the housing space-forming parts 131 that each are formed to have a rectangular shape are provided. In the present embodiment each housing space-forming part 131 is made from stainless steel, which is a metal, and its thickness is less than that of the material to be laminated W. Each housing space-forming part 131 is bonded to the first sheet-member 112 with a heat-resistant adhesive.

The housing space-forming parts 131 divide the housing part 130a into the housing space S and a flow-channel space H, while the housing space-forming parts 131 are sandwiched between the first sheet-member 112 and the second sheet-member 122. In the housing space S the material to be laminated W is positioned in a space enclosed by the housing space-forming parts 131, and the flow-channel space H that communicates with the exhaust part 130b outside the outer circumference of the housing space-forming parts 131, 131, exhausts the housing space S. By having this structure, the material to be laminated W can be positioned precisely in the housing space S and also the flow-channel space H can be secured for the exhaustion of air. So, a flow-channel for the exhausted air does not get blocked by the displacement in the position of the material to be laminated W, and so the housing space S can be securely exhausted without fail.

A thickness-adjusting part 132 that increases the thickness of a part of each housing space-forming part 131 is provided on the upper surface of the housing space-forming part 131. The thickness-adjusting part 132 is provided at least on one side that lies downward in the transporting direction. In the present embodiment the thickness-adjusting parts 132 are provided on two sides of the four sides of the housing space-forming parts 131 that are formed in a rectangular shape, where the two sides are roughly perpendicular to the transporting direction. The thickness-adjusting part 132, when combined with the housing space-forming parts 131, has a thickness that is more than that of the material to be laminated W. In having such a constitution, the jig for fixing material to be laminated can gradually pressurize the material to be laminated W. So, the material to be laminated W is free from any damage that would be caused by an excessive load affecting the end parts of the material to be laminated W.

Metal materials, particularly stainless steel, can suitably be used as materials for the housing space-forming part 131 and the thickness-adjusting part 132. Stainless steel is not costly compared with heat-resistant rubber material and can be processed with ease, such that the cost of manufacturing the jig for fixing material to be laminated can be kept low. Also, metal materials have high durability and heat resistance, so that they can be used repeatedly and for a long time. Also, they can suitably be used when the material to be laminated W is pressure-bonded by pressurizing and by being heated to a high temperature. In the present embodiment, for the same reasons as given above, stainless steel was used for the sealing member 130.

A cover for a flow-channel 170 has a shape of a plate-like member, the outer shape of which is rectangular. It covers at least a part of the exhaust part 130b, and has an opening that is formed to be rectangular so that the housing part 130a is exposed. By this constitution the jig for fixing material to be laminated can prevent the second sheet-member 122 from being sucked into the exhaust part 130b when the housing space S is exhausted. So, insufficient exhausting of the housing space S, which insufficient exhausting would be caused by the exhaust hole 112a being blocked by the second sheet-member 122, can be prevented.

The jig for fixing material to be laminated 100, thus constituted, can dispose the material to be laminated W in the housing space S, can exhaust the housing space S by means of the exhaust device 3, and can fix the material to be laminated W that is disposed in the housing space S by having the first sheet-member 112 and the second sheet-member 122 closely attached to the material to be laminated W.

By using a pressurizing device such as the roller-type press to pressurize the material to be laminated W, the apparatus for manufacturing bonded laminated material can manufacture bonded laminated material.

The jig for fixing material to be laminated of the present invention can be constituted to comprise the following elements, thereby pressurizing the material to be laminated W while transporting them in one direction, wherein the jig for fixing material to be laminated comprises:

a housing space that can house material to be laminated;
an exhaust passage that is formed to be connected to the housing space;
a first exhaust port and a second exhaust port that can alternately be switched to the exhaust passage that connects the housing space and the exhaust device; and
wherein when the material to be laminated is disposed in the housing space and the space is exhausted by the exhaust device, the jig for fixing material to be laminated fixes the material to be laminated within the housing space.

In addition to the jig for fixing material to be laminated that has a structure as given in the Examples of the present invention, a jig for fixing material to be laminated such as the one given in the applicant's application, No. 2011-226776, can be adopted, where the jig for fixing material to be laminated fixes the material to be laminated by depressurizing the space where the material to be laminated is to be disposed and has a first exhaust port and a second exhaust port that can alternately be switched to the exhaust passage that connects the housing space and the exhaust device.

Figure 6:
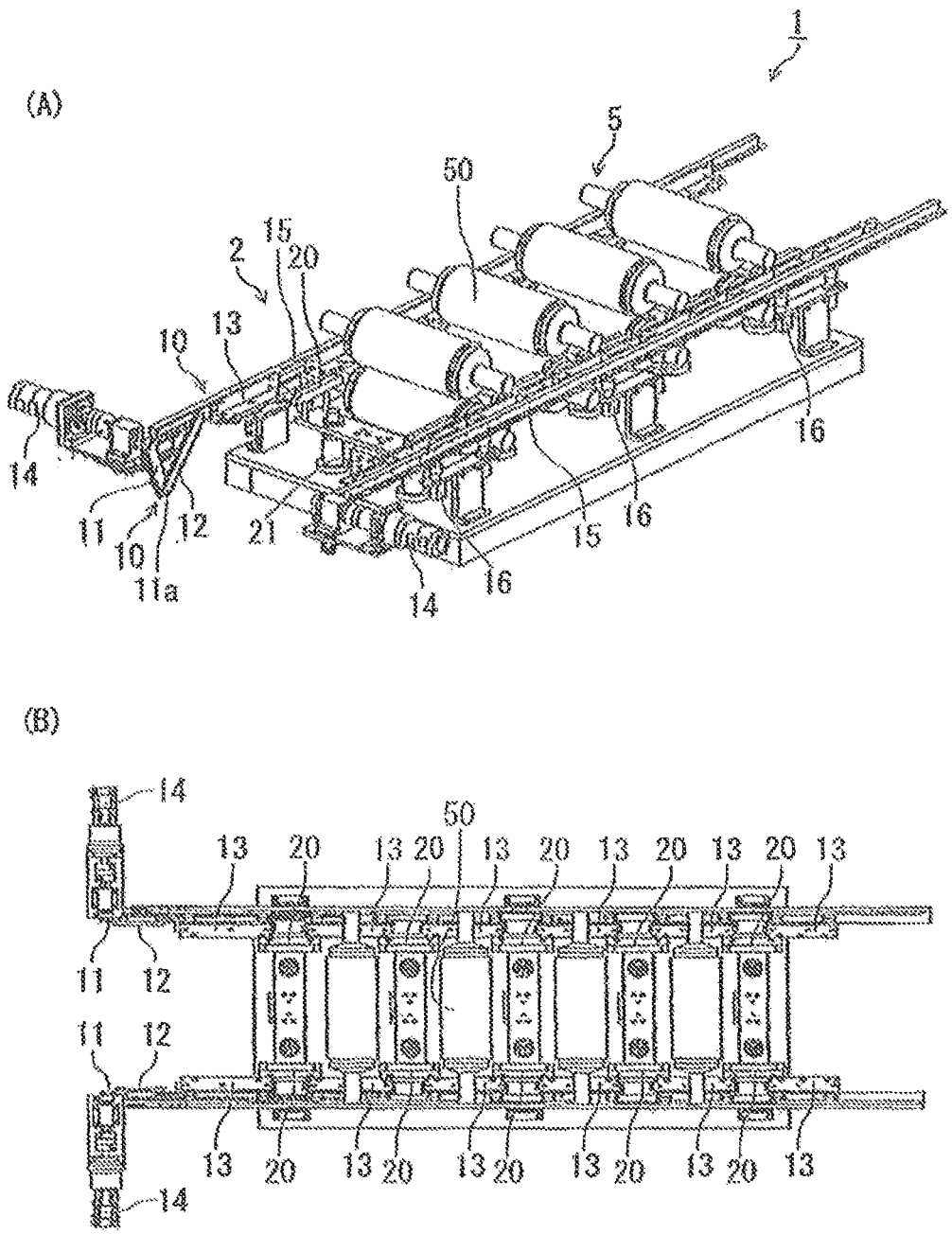
FIG. 6 illustrates the schematic structure of the apparatus for manufacturing bonded laminated material adopting the transport system of the present invention.
Figure 7:
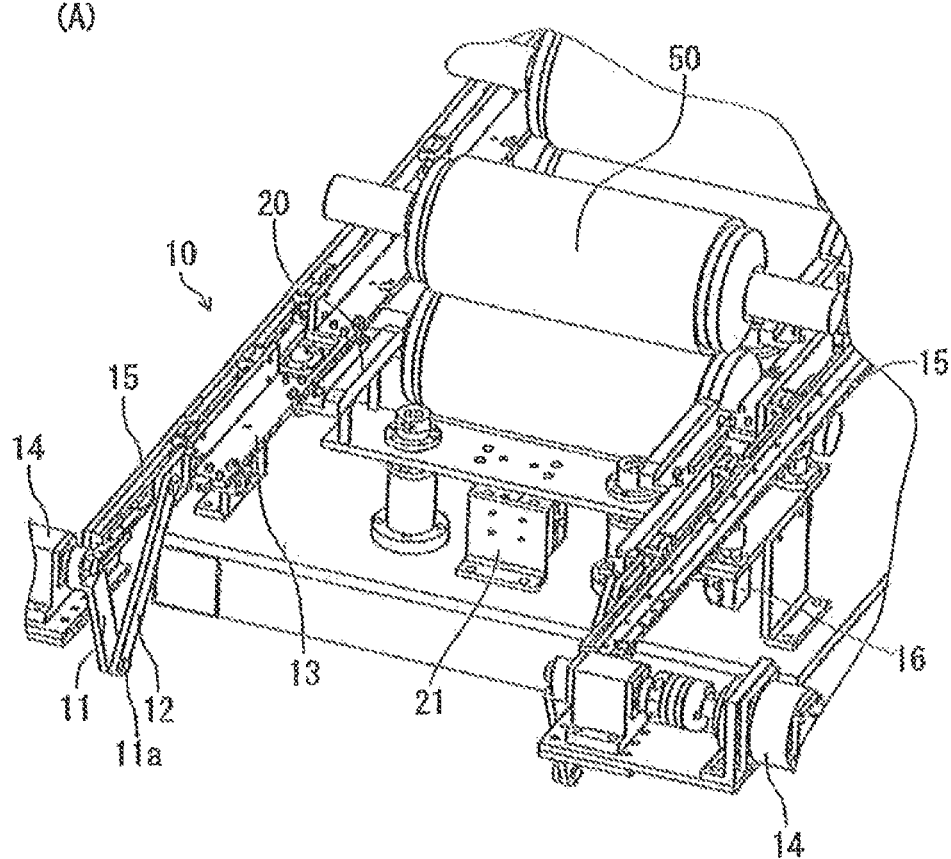
FIG. 7 illustrates the schematic structure of the apparatus for manufacturing bonded laminated material adopting the transport system of the present invention.

Next, the structure of the apparatus for manufacturing bonded laminated material is explained by reference to FIGS. 6 and 7. In FIG. 6(A) the jig for fixing material to be laminated 100 is transported from the left and near side to the right and back side. The left and near side is upstream of the direction of transport. In FIG. 6(B) the jig for fixing material to be laminated 100 is transported from the left to the right and the left side is upstream of the direction of transport. FIG. 7(A) is an enlarged perspective view showing the arrangement of each component near the crank-slider transporting device and FIG. 7(B) is an enlarged perspective view showing the arrangement of each component near the shuttle of the crank-slider transporting device and the intermediate table.

As shown in FIG. 6, in the present embodiment the pressurizing device 5 is a roller-type press that has four sets of pressurizing rollers 50 and can continuously press the material. As a pressurizing roller 50, a roller for hot pressurizing that has a built-in heating device, such as an electric heater, and that can heat and pressurize the material to be laminated W, can be used. Also, a cold pressurizing roller that has a coolant device such as a built-in refrigerant piping and that pressurizes the material to be laminated W while it cools the material to be laminated W, can be provided at the downstream side of the roller for hot pressing.

As shown in FIGS. 6 and 7, the transporting device 2 comprises the crank-slider transporting device 10 that transports the jig for fixing material to be laminated 100 to the pressurizing device 5 and carries it out from the pressurizing device 5 and comprises the intermediate tables 20 that are each positioned downstream of each of the pressurizing rollers 50 of the pressurizing device 5 and that receive from the crank-slider transporting device 10 the jigs for fixing material to be laminated 100 that were processed in the pressurizing step of the pressurizing device 5 and hold the jigs on them. Guide rails 15, 15 are each provided outside the pressurizing parts of the pressurizing rollers 50, so that the pressurizing rollers 50 can pressurize only the first sheet-member 112 and the second sheet-member 122, which do not include the parts of the first pillar-members 111 or the second pillar-members 121.

The crank-slider transporting device 10 comprises:

a slider, and a motor 14 that is a device that drives the slider, wherein the slider comprises the shuttle 13 on which the jig for fixing material to be laminated 100 is loaded, the crank-arm 11, the link 12, and the guide rail 15, and the slider has the shuttle go back and forth in the transporting direction.

By having the slider of such a constitution, a transporting device that has a simple structure and is space-saving can be arranged. Also, the crank-slider transporting device 10 is connected to a lifting cylinder 16, which is a lifting device that can move vertically so that the entire crank-slider transporting device 10 can move up and down.

The guide rails 15 are provided outside the pressurizing part of the pressurizing rollers 50 in parallel to the transporting direction.

The crank-arm 11, the link 12, and the shuttle 13 are disposed corresponding to each guide rail 15 along the transporting direction. The crank-arm 11, the link 12, and the shuttle 13 on one guide rail 15 are opposed to those of the other guide rail 15. In the present embodiment the shuttles 13 are provided along both guide rails, at six locations for each guide rail 15, which locations correspond to the positions of the pressurizing rollers 50. The shuttles are arranged to be connected with each other so that they coordinate their movements.

One end of the crank-arm 11 is connected to the motor 14 in a way that the crank-arm 11 can rotate around the point of connection. The other end of the crank-arm 11 is connected to one end of the link 12 at a pivot point 11a, around which point both the crank-arm 11 and the link 12 can rotate. The other end of the link 12 is connected to the shuttle 13 that is disposed at the most upstream point. The guide rail 15 guides the shuttle 13 in the transporting direction and toward the pressurizing roller 50, while the shuttle is driven by the link 12 and makes a reciprocating motion.

The shuttle 13 carries the jig for fixing material to be laminated 100 onto the first pillar-member 111 and fixes it. A surface for loading 13a of the shuttle that carries the first pillar-member 111 is provided with the first exhaust connector 13b that communicates with the first exhaust port 116 and exhausts the housing space S by means of the exhaust device 3 when the jig for fixing material to be laminated 100 is disposed; a proximity sensor 13c that detects whether the jig for fixing material to be laminated 100 is disposed; and a positioning pin 13d that positions the jig for fixing material to be laminated 100.

The first exhaust connector 13b protrudes upward so that it can be inserted into the first exhaust port 116. The first exhaust connector 13b is connected to the exhaust device by vacuum piping (not shown). The first exhaust connector 13b that is disposed on at least one of a set of opposing shuttles 13 is connected to the pressure switch 3b.

The intermediate table 20 is provided at the inner side of the shuttle 13, receives the jig for fixing material to be laminated 100 from the shuttle 13, and places the first pillar-member 111 on the surface for loading 20a of the intermediate table 20. The second exhaust connector 20b that communicates with the second exhaust port 117 and that exhausts the housing space S by means of the exhaust device 3 is provided on the surface for loading 20a. The second exhaust connector 20b protrudes upward so that it can be inserted into the second exhaust port 117. The second exhaust connector 20b is connected to the exhaust device 3 by a vacuum piping (not shown). The second exhaust connector 20b that is provided on at least one of a set of the opposing intermediate tables 20 is connected to the pressure switch 3b.

The intermediate table 20 is connected to a lifting cylinder 21, which is a lifting device that can move up and down vertically. So, all intermediate tables 20 can go up and down vertically in a coordinated movement. In the present embodiment the intermediate table 20 is provided both upstream and downstream of each pressurizing roller 50, in total at five locations.

About the position of the crank-slider transporting device 10 relative to the shuttle, it is so arranged that when the shuttle is positioned on the most upstream side (FIG. 8) or the most downstream side (FIG. 11), the crank-slider transporting device 10 is positioned to be adjacent to the intermediate table 20.

The transport method for transporting the jig for fixing material to be laminated 100 using the transport system T and the method for manufacturing bonded laminated material are now explained by reference to FIGS. 8 to 12.

Figure 3:
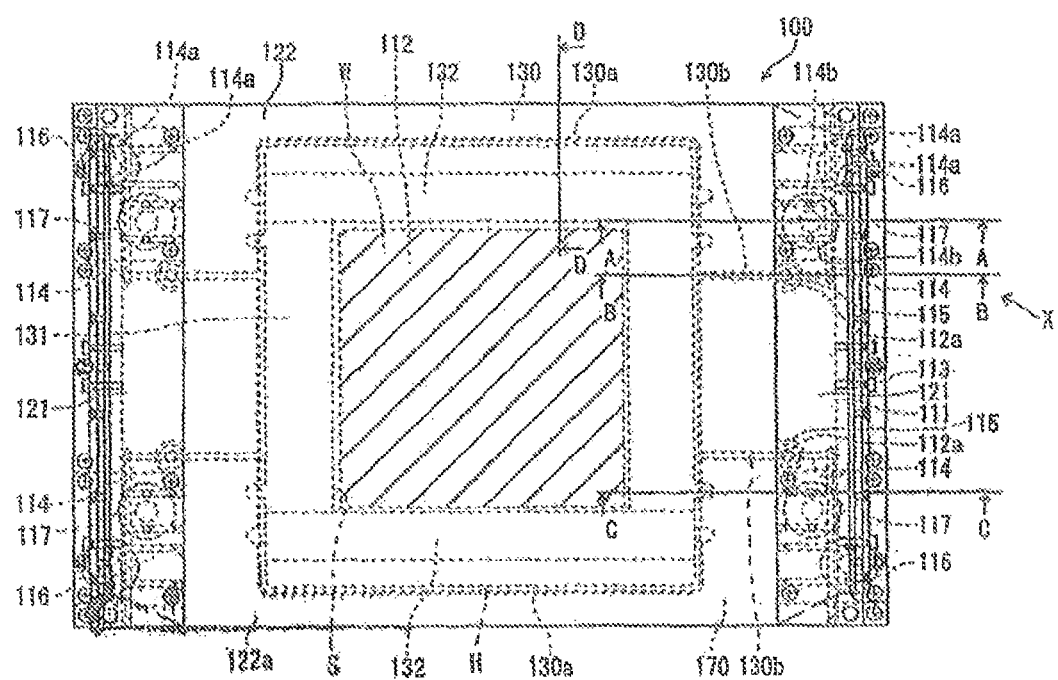
FIG. 3 is a plan view showing the material to be laminated that is placed in the jig for fixing material to be laminated.
Figure 4:
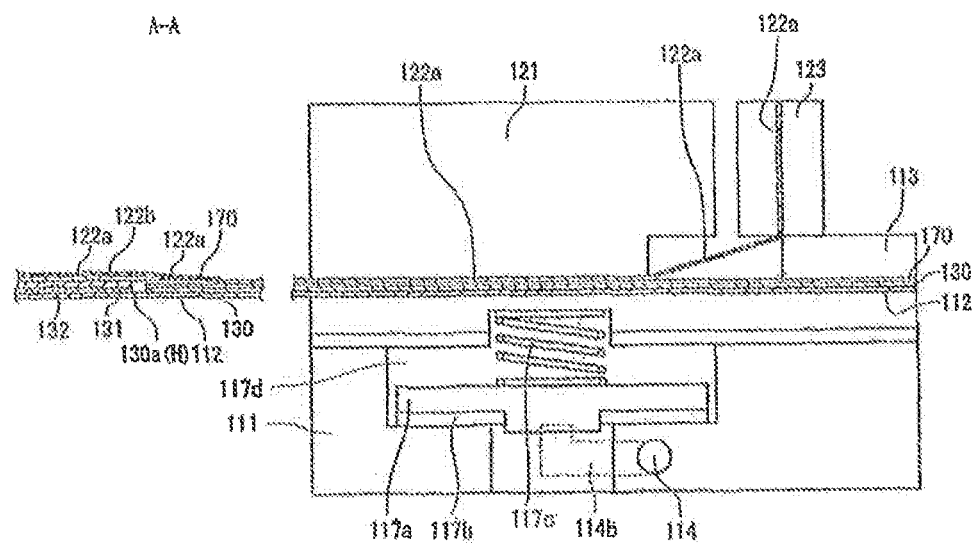
FIG. 4 is a sectional view showing the material to be laminated that is placed in the jig for fixing material to be laminated.
Figure 4:
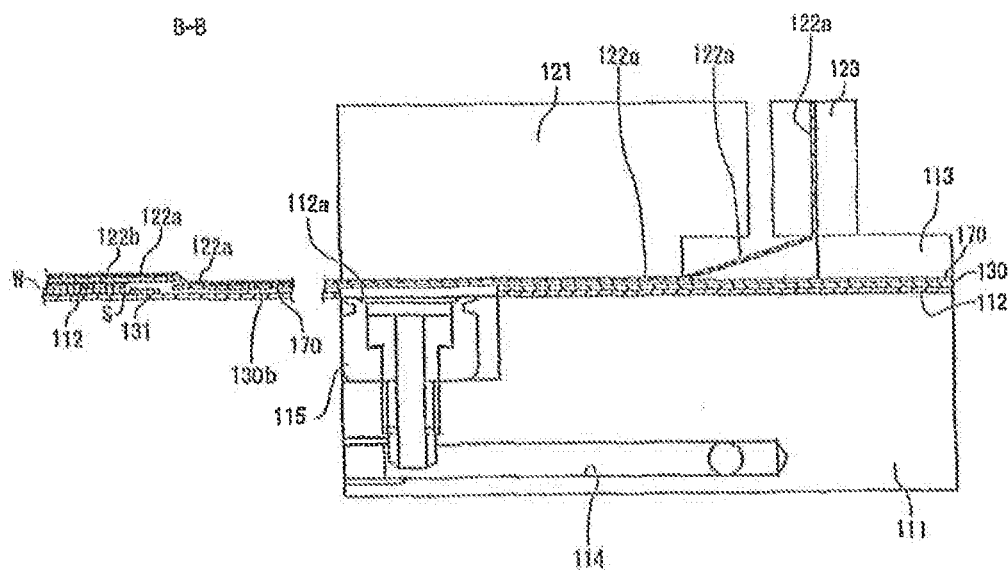
Figure 5:
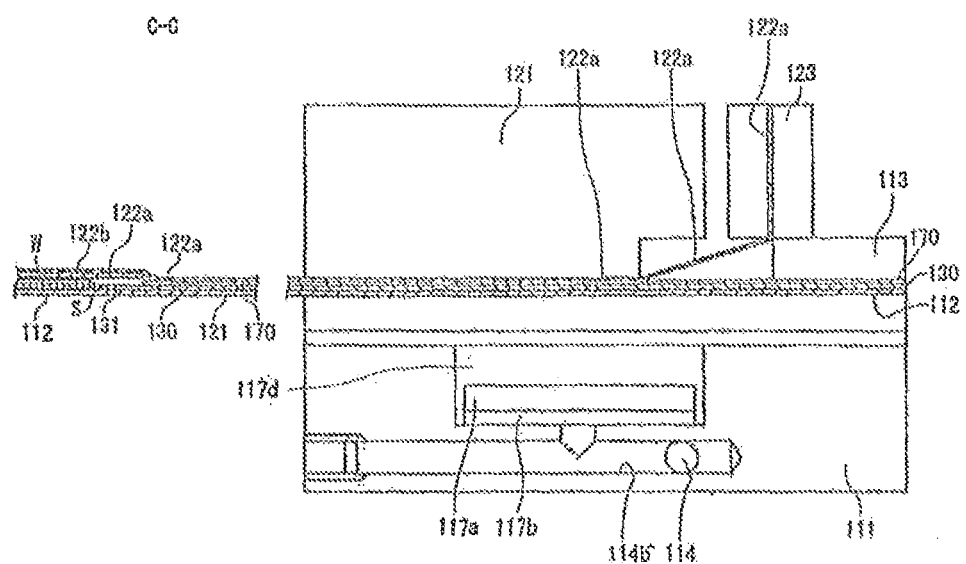
FIG. 5 is a sectional view showing the material to be laminated that is placed in the jig for fixing material to be laminated.
Figure 5:
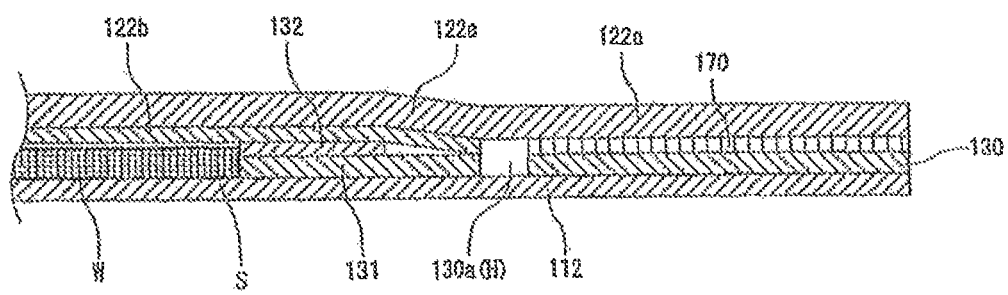
Figure 12:
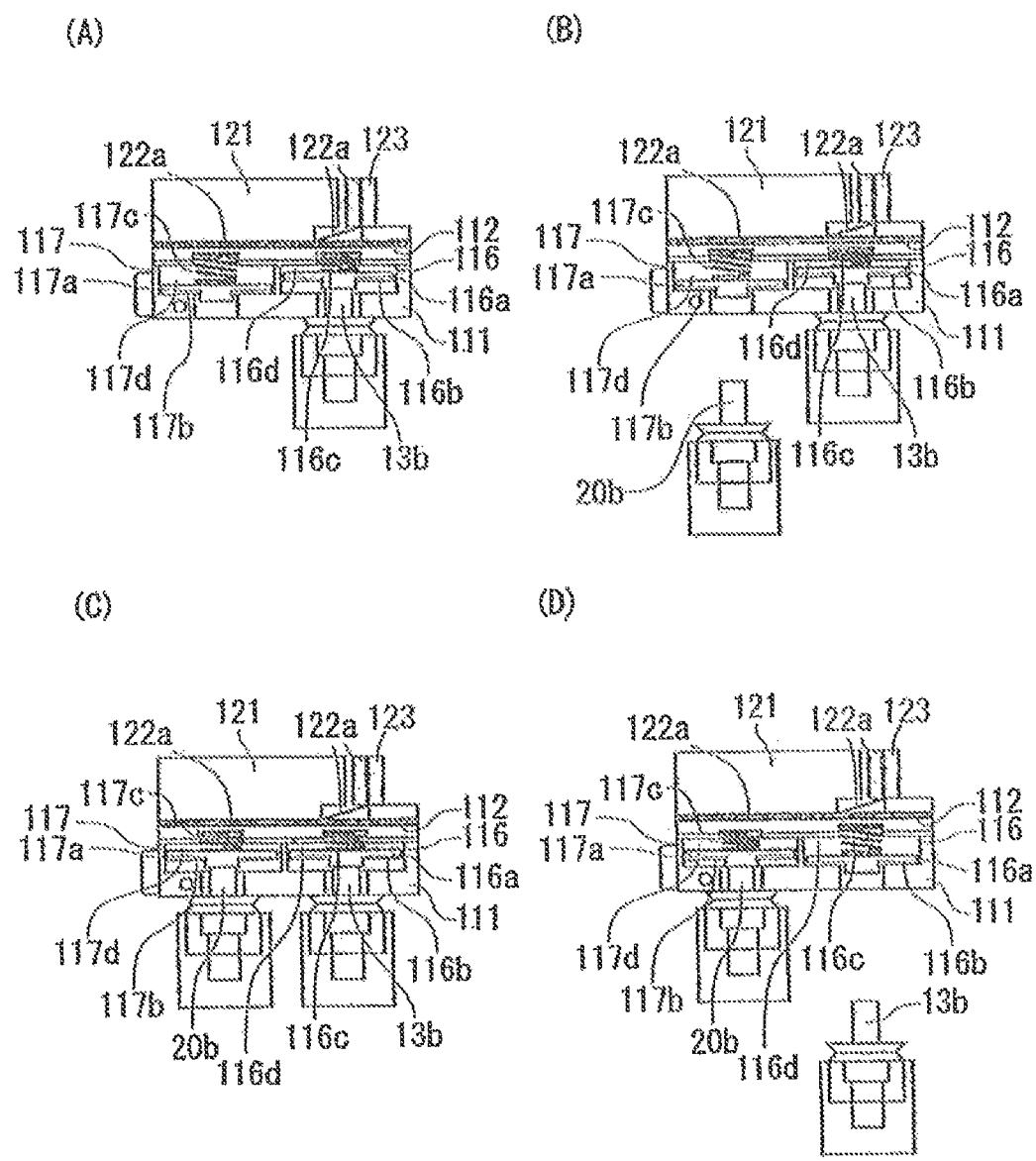
FIG. 12 is a sectional illustration that shows the movements of the shuttle and the intermediate table when the jig for fixing material to be laminated is transported, and the movements of the first exhaust connector and the second exhaust connector.

FIG. 12 is a cross-sectional view at the plane that is perpendicular to the direction X of FIG. 3, where the components of the apparatus for manufacturing bonded laminated material as seen from the direction X of FIG. 3 are illustrated, such that the right-hand side of the apparatus, based on the transporting direction, can be observed and where also the first exhaust port 116 and the second exhaust port 117 are seen side by side. FIG. 12 shows in a diagram a part of the structure of the apparatus for manufacturing bonded laminated material (while some parts are omitted for the sake of simplicity). FIG. 12 explains the movements of the shuttle 13 and the intermediate table 20 and of the first exhaust connector 13b and the first exhaust connector 13b and the second exhaust connector 20b, when the jig for fixing material to be laminated is transported.

Figure 8:
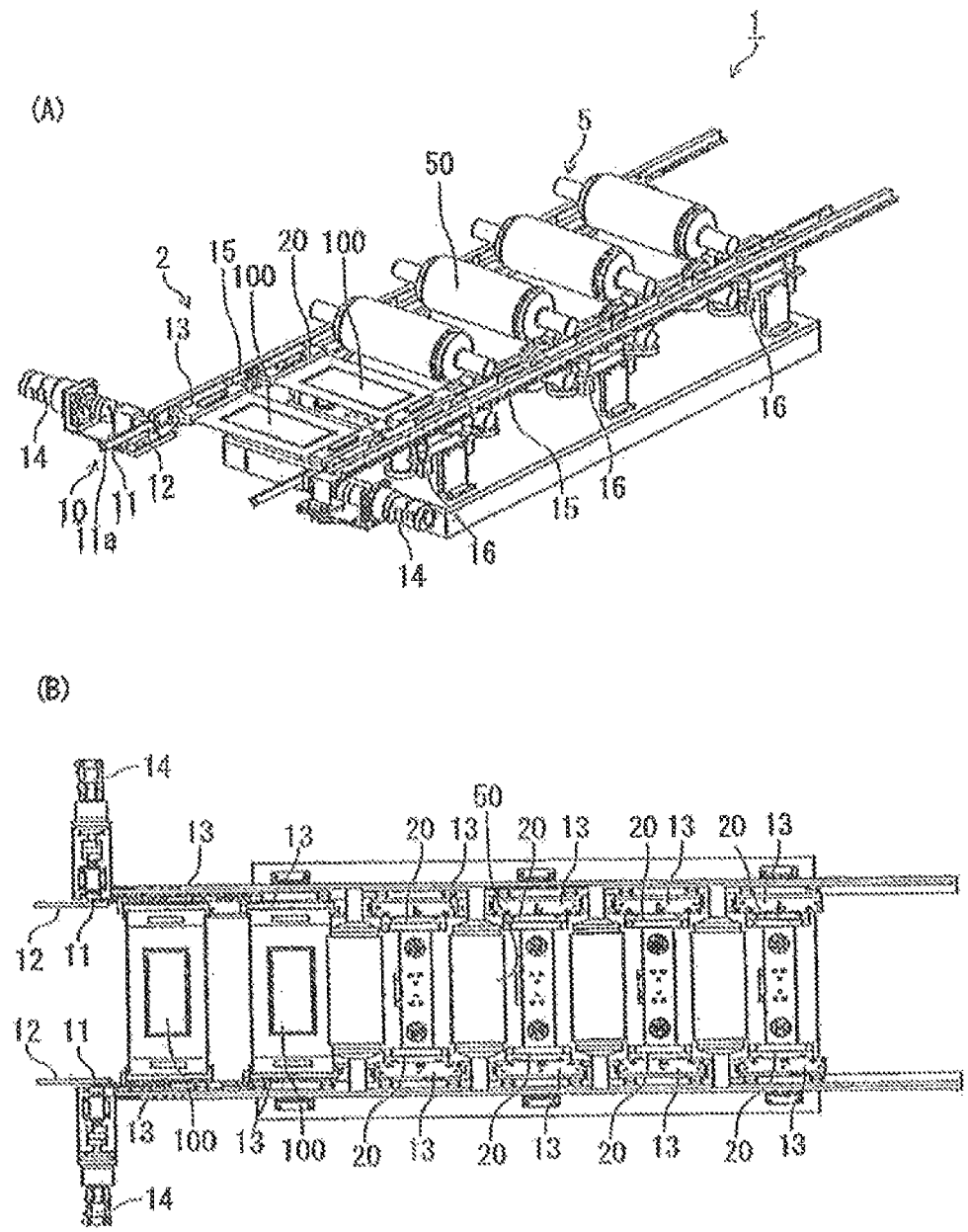
FIG. 8 illustrates the step of transporting the jig for fixing material to be laminated, of the transport system of the present invention.

First, as shown in FIG. 8, the jig for fixing material to be laminated 100 is placed by having the first pillar-member 111 be placed on the surface for loading 13a of the shuttle 13, when a pivot point 11a is at its most upstream position, that is, when the shuttle 13 is at its most upstream position. Concurrently the intermediate table 20 is positioned lower than the shuttle 13 by the lifting cylinder 21. FIG. 8 shows that two pieces of the jigs for fixing material to be laminated 100 are disposed. But the number of the jigs for fixing material to be laminated 100 is not limited to this number.

As shown in FIG. 12(A), only the first exhaust connector 13b is connected to the first exhaust port 116 of the first pillar-member 111 by being inserted into it. When the first exhaust connector 13b is inserted into the first exhaust port 116, the check valve 116a that was biased downward in FIG. 12(A) is pushed upward by a spring 116c. Thus the opening of the first exhaust passage 114a that was closed by the sealing member 116b opens and the communicating part 116d communicates with the first exhaust passage 114a. Accordingly the housing space S communicates with the first exhaust port 116 via the first exhaust passage 114a whereby the housing space S can be exhausted.

Figure 9:
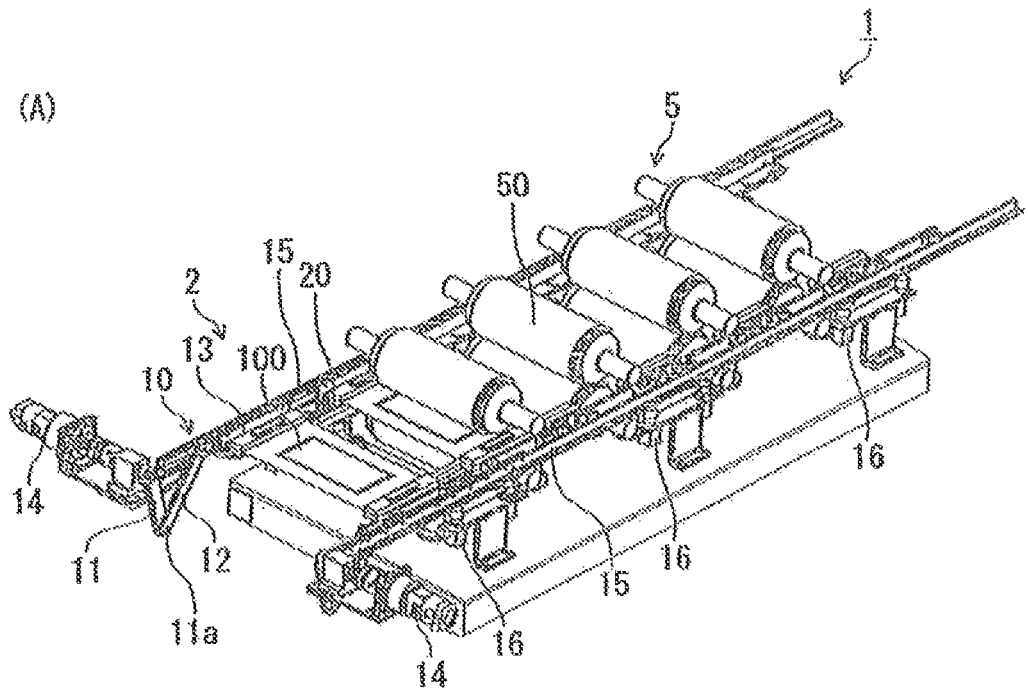
FIG. 9 illustrates the step of pressurizing the jig for fixing material to be laminated.
Figure 9:
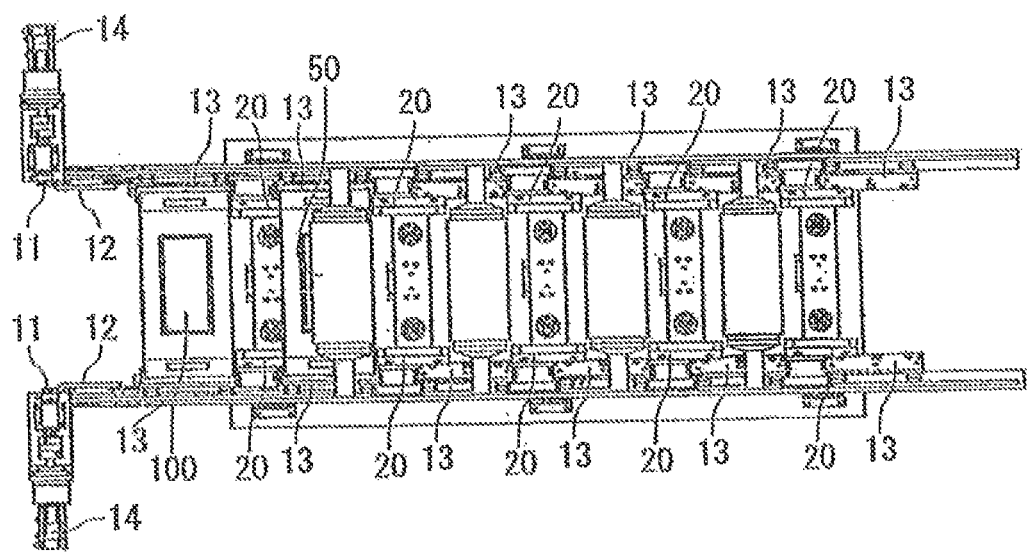

Next, as shown in FIG. 9, when the motor 14 is switched on and the crank-arm is rotated, the shuttle 13 is transported by the link 12 along the guide rail 15, whereby the jig for fixing material to be laminated 100 is transported toward the pressurizing rollers 50 while the housing space S is continuously exhausted.

The jig for fixing material to be laminated 100 is transported in such a way that both the first sheet-member 112 and the second sheet-member 122 are on the same level as the surfaces of the pressurizing rollers 50, respectively.

Figure 10:
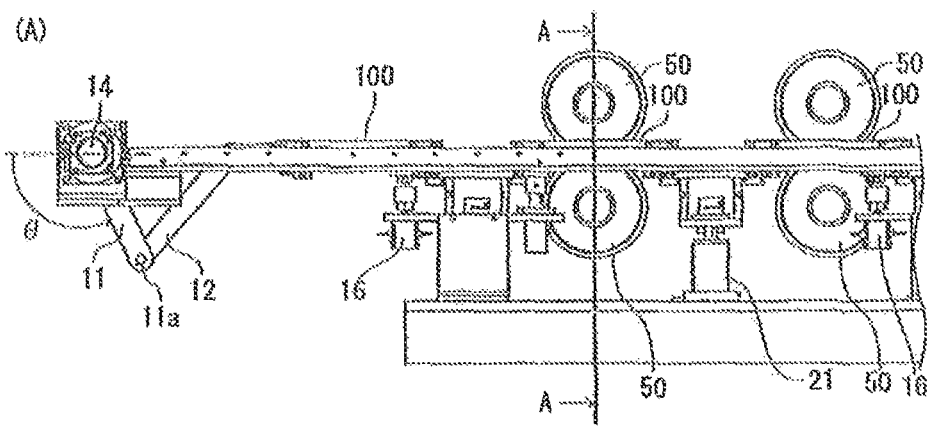
FIG. 10 illustrates the step of transporting the jig for fixing material to be laminated, of the transport system of the present invention.
Figure 10:
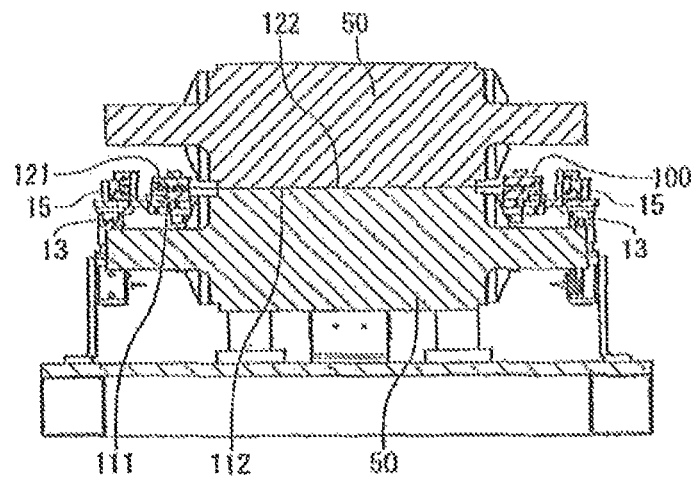

When the jig for fixing material to be laminated 100 reaches the pressurizing rollers 50, then, as shown in FIG. 10, a load is put on the material to be laminated W by the pressurizing force of the pressurizing rollers 50 via the first sheet-member 112 and the second sheet-member 122 while the material to be laminated W is transported downstream.

In this way the material to be laminated W are pressurized and the bonded laminated material is manufactured.

The control device 4 controls the speed of the transport of the jig for fixing material to be laminated so that it is transported corresponding to the predetermined feeding speed of the pressurizing rollers 50 at least while the jig for fixing material to be laminated 100 is being pressurized by the pressurizing rollers 50. The speed of the transport of the jig for fixing material to be laminated 100 is controlled by the control device 4 based on an angular speed ω of the crank-arm that is calculated by detecting the rotating angle θ of the crank (FIG. 10(A)) from an encoder of the motor 14 and by inputting command values for controlling the speed based on the feeding speed v of the pressurizing rollers 50, wherein the angular speed is calculated by the formula given below. [r] is the length of the crank-arm, L is the length of the link, and λ is the ratio of the length of the crank-arm to the length of the link (=r/λ).

$$\varpi = \frac{v}{r\left(\sin\theta + \frac{\lambda}{2}\sin 2\theta\right)}$$ Formula 1

The transport speed is controlled in this way such that a force of friction between the jig for fixing material to be laminated 100 and the pressurizing rollers 50 is reduced, the operating lives of the jig for fixing material to be laminated 100 and the pressurizing rollers 50 are prolonged, and an overly heavy force is least likely imparted to the material to be laminated. Thus a high quality bonded laminated material can be manufactured. Moreover, by means of a transport encoder that detects a displacement in the transport by the shuttle 13, and by means of a feeding speed encoder of the pressurizing device that detects a displacement of the feeding, the difference between the transporting speed and the feeding speed of the pressurizing device is detected. So, a correction can be made in the feeding speed of the motor 14 to minimize the difference in the speed based on the formula. If the control is performed based on the formula, the feeding speed of the pressurizing device and the transporting speed of the jig for fixing material to be laminated 100 can be more accurately synchronized.

Figure 11:
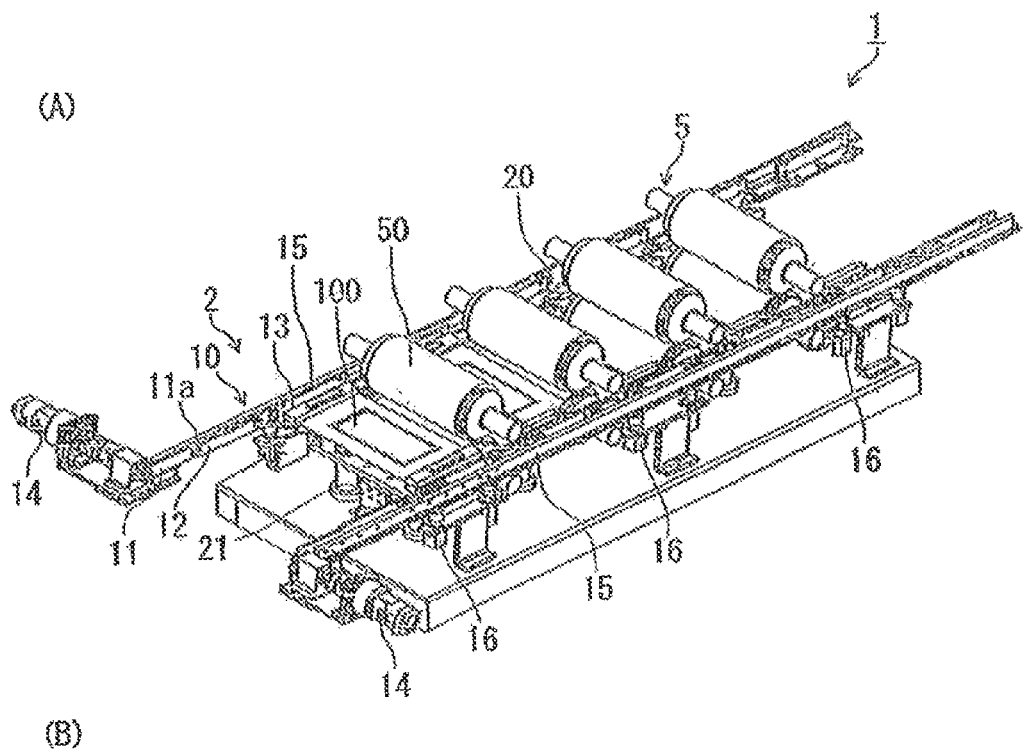
FIG. 11 illustrates the step of transporting the jig for fixing material to be laminated, of the transport system of the present invention.
Figure 11:
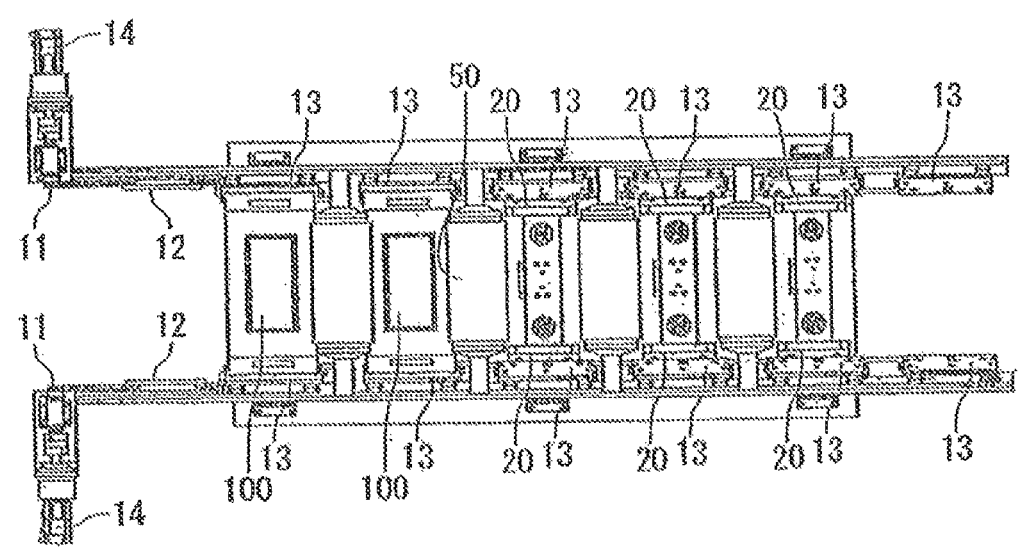

Next, as shown in FIG. 11, when the pivot point 11a comes to the most downstream point, each shuttle is positioned at the most downstream point where the jig for fixing material to be laminated 100 is discharged from the pressurizing rollers 50. Then the intermediate table 20 is positioned adjacent to and downstream of the shuttle 13. As the intermediate table 20 is positioned downstream of the shuttle 13, then as shown in FIG. 12(B) the second exhaust connector 20b is positioned downstream of the second exhaust port 117.

Next the intermediate table 20 is moved upward by the lifting cylinder 21 until the surface for loading 20a is moved to the same level as the surface for loading 13a of the shuttle 13. By this movement the jig for fixing material to be laminated 100 is held by both the shuttle 13 and the intermediate table 20, whereby, as shown in FIG. 12 (C), the second exhaust connector 20b is inserted into the second exhaust port 117 and it communicates with the housing space S. That is, the first exhaust port 116 and the second exhaust port 117 both communicate with the housing space S and the air is exhausted from the housing space S.

Then the crank-slider transporting device 10 is lowered by the lifting cylinder 16. By this movement only the intermediate table 20 holds the jig for fixing material to be laminated 100, which was transferred from the shuttle 13 to the intermediate table 20. On this occasion, as shown in FIG. 12 (D) the first exhaust connector 13b is lowered by the downward movement of the shuttle 13 and the exhaust passage is switched to the second exhaust passage 14b and the housing space S continues to be exhausted by the second exhaust connector 20b.

The crank-slider transporting device 10, while it is kept in a lowered position, returns the shuttle 13 to the most upstream position by the movement of the crank-arm 11 that is driven by the motor 14.

Then when the crank-slider transporting device 10 is moved upward by the lifting cylinder 16 the positions of the first exhaust connector 13b and the second exhaust connector 20b are in the same positions as shown in FIG. 12(C). Further, when the intermediate table 20 is lowered by the lifting cylinder 21, the positions of the first exhaust connector 13b and the second exhaust connector 20b are in the same positions as shown in FIG. 12(A). Then by the above processes being repeated the jig for fixing material to be laminated 100 is transferred from the intermediate table 20 on the upstream side to the shuttle 13, and then pressurized by the pressurizing rollers 50 while it is being transported by the shuttle 13. The jig for fixing material to be laminated 100 is further transferred from the shuttle 13 to the intermediate table 20 on the downstream side. Thus the jig for fixing material to be laminated 100 is transported from the upstream side to the downstream side while the housing space S is maintained in an exhausted condition.

Also, as stated above, as the jig for fixing material to be laminated 100 is transferred by either the shuttle 13 or the intermediate table 20 being lifted or lowered relative to the other based on the pressurizing surface of the pressurizing roller 50, transferring the jig for fixing material to be laminated 100 is securely carried out.

The proximity sensor 13c can also be provided on the intermediate table 20. The control device 4 determines, based on the signal from the proximity sensor 13c, whether the jig for fixing material to be laminated 100 is properly placed on the shuttle 13 and/or the intermediate table 20. If the control device 4 determines that the jig for fixing material to be laminated 100 is not placed properly, it sends a warning and stops the movements of all the movable elements (transporting device 2, the pressurizing rollers 50, etc.) of the transport system.

Also, the control device 4 determines, based on the signal from the pressure switch 3b, whether the pressure in the housing space S is within an allowable range. If the control device 4 determines that it is not within the allowable range it records that the material to be laminated W in the jig for fixing material to be laminated 100 is defective and treats it as such. Also, as the control device 4 can control the pressure within the housing space S to a predetermined level by means of the pressure switch 3b, it can control the force to fix the material to be laminated W, which force is caused by the first sheet-member 112 and the second sheet-member 122 holding the material to be laminated W tightly.

Modified Example

The number of pressurizing rollers 50 of the pressurizing device 5 can be freely decided depending on the bonded laminated material that is manufactured or on the manufacturing processes. Also, in the present embodiment the crank-slider transporting device 10 is selected as a transporting device. But another transporting device can be used as the transporting device that can transport the object to be pressurized in one direction. For example, a transporting device using ball screws can be adopted.

In the present embodiment the crank-slider transporting device 10 and the intermediate table 20 each have a lifting device. But either the crank-slider transporting device 10 or the intermediate table 20 may have a lifting device, depending on the requirement. Further, neither of them may have a lifting device if transferring the jig for fixing material to be laminated 100 can be carried out.

The apparatus for manufacturing bonded laminated materials 1 may comprise a preheating member that is located upstream of the pressurizing rollers 50 as seen from the transporting direction of the jig for fixing material to be laminated 100 and that preheats the jig for fixing material to be laminated 100 and the material to be laminated W and it may comprise a residual heat removing member that is located downstream as seen from the transporting direction of the jig for fixing material to be laminated 100 and that cools the jig for fixing material to be laminated 100 and the material to be laminated W. By comprising these members the apparatus for manufacturing bonded laminated materials 1 can securely preheat and cool the jig for fixing material to be laminated 100 and the material to be laminated W within a short time, whereby the yield can be improved. The transport system T can be applied to transporting, receiving, and transferring the jig for fixing material to be laminated 100 from and to, and also within, the preheating member and the residual heat removing member.

In the present embodiment a roller-type press is adopted as a pressurizing device 5 but the pressurizing device is not limited to it. A pressurizing device other than a double-belt-type press that can carry forward the object in a straight line, such as a flat-plate press, which is a pressurizing device of a batch-type, can also be used as a pressurizing device 5.

If the flat-plate press is used the pressing can be performed with the jig for fixing material to be laminated 100 being placed on the intermediate table 20. Alternatively, the pressing can be performed while the jig for fixing material to be laminated 100 is kept in a stationary position between the intermediate tables 20.

Effect of the Embodiment of the Invention

The transport system T of the jig for fixing material to be laminated, the transport method for transporting the jig for fixing material to be laminated, and the apparatus for manufacturing bonded laminated material 1 that uses the transport system T, of the present invention, adopt the transport system T that transports the jig for fixing material to be laminated 100 in a straight line. So, all the processes can be arranged in a straight line in the direction of the transport, such that a dead space that could not be avoided in the case of a rotating turntable would not occur. In this way a transporting device T can be a space-saving system, which in turn can minimize the size of the apparatus for manufacturing bonded laminated material 1.

As the apparatus for manufacturing bonded laminated material 1 has the structure as stated above, it can continuously transport the jig for fixing material to be laminated 100 and continuously pressurize it, by repeating the movements wherein the apparatus for manufacturing bonded laminated material transfers the jig for fixing material to be laminated 100 from the intermediate table 20 on the upstream side to the shuttle 13, which then transports and transfers it to the intermediate table 20 on the downstream side while keeping the housing space S exhausted, in which housing space S the material to be laminated W is housed.

Also, the transport system T transports the jig for fixing material to be laminated 100 at a speed that corresponds to the feeding speed of the pressurizing rollers 50 while the jig for fixing material to be laminated 100 is pressurized by the pressurizing rollers 50. So, the force of friction that would occur between the jig for fixing material to be laminated 100 and the pressurizing rollers 50 can be reduced, which enables the jig for fixing material to be laminated 100 and the pressurizing roller 50 to have longer lives. Also, the material to be laminated is not likely to be subject to an excessive load. So, a bonded laminated material of high quality can be manufactured.

By the embodiment of the present invention a transport system T can be used for a pressurizing device (a roller-type press or a double-belt-type press) that can pressurize an object to be pressurized while it transports the object in a straight line, so that the bonded laminated materials can be manufactured efficiently.

Also, a simple exhaust device can be used, so that no costly exhaust means of a large capacity is required.

Other Embodiments

In the above embodiment the transport system T that transports the jig for fixing material to be laminated 100 in a straight line is provided. But the transport system T is not restricted to this type of transport system. For example, the transport system can be arranged in such a way that the guide rail 15 is formed in a curved line such as in a circular arch and that a connecting point of the crank-arm 11 and the link 12, and a connecting point of the link 12 and the shuttle 13, can move in three dimensions, to allow the jig for fixing material to be laminated 100 to be transported in a direction other than in a straight line. Further, by having the guide rail 15 form a non-linear line before and after the intermediate table 20 that is taken as a base point for a change of direction, the jig for fixing material to be laminated 100 can be redirected starting at the intermediate table 20 that is the base point.

The basic Japanese Patent Application, No. JP2011-258884, filed Nov. 28, 2011, is hereby incorporated in its entirety by reference in the present application.

The present invention will become more fully understood from the detailed description of this specification. However, the detailed description and the specific embodiment illustrate desired embodiments of the present invention and are described only for the purpose of explanation. Various changes and modifications will be apparent to those of ordinary skill in the art on the basis of the detailed description.

The applicant has no intention to dedicate to the public any disclosed embodiments. Among the disclosed changes and modifications, those that may not literally fall within the scope of the present claims constitute, therefore, a part of the present invention in the sense of the doctrine of equivalents.

The use of the articles "a," "an," and "the," and similar referents in the specification and claims, are to be construed to cover both the singular and the plural, unless otherwise indicated herein or clearly contradicted by the context. The use of any and all examples, or exemplary language (e.g., "such as") provided herein, is intended merely to better illuminate the invention and does not pose a limitation on the scope of the invention unless otherwise claimed.

NAMES OF SYMBOLS 1 apparatus for manufacturing bonded laminated material
2 transporting device
3 exhaust device
5 pressurizing device
10 crank-slider transporting device 11 crank-arm
12 link
13 shuttle
13a surface for loading
13b first exhaust connector
14 motor
15 guide rail
16 lifting cylinder
20a surface for loading
20b second exhaust connector
21 lifting cylinder
100 jig for fixing material to be laminated
114 exhaust passage
116 first exhaust port
116a check valve
117 second exhaust port
117a check valve
S housing space
T transport system
W material to be laminated

The invention claimed is:

1. An apparatus for manufacturing bonded laminated material where a material to be laminated made of laminated membranes is pressurized by means of a pressuring device, and the apparatus transports a jig for fixing material to be laminated while fixing the material to be laminated, comprising: a jig for fixing material to be laminated; a pressurizing device;
an exhaust device that can be connected to the jig for fixing material to be laminated;
a transporting device comprising:
a shuttle that carries the jig for fixing material to be laminated;
a slider that causes the shuttle to make a reciprocating movement in a transporting direction;
a driving device that drives the slider; and
an intermediate table that receives the jig for fixing material to be laminated from the shuttle and holds the jig on it;
wherein the jig for fixing material to be laminated comprises:
a housing space that can house the material to be laminated;
an exhaust passage that is formed to be connected to the housing space;
a first exhaust port and a second exhaust port that can alternately be switched to the exhaust passage that connects the housing space and the exhaust device;
wherein when the material to be laminated is disposed in the housing space and the space is exhausted by the exhaust device, the jig for fixing material to be laminated fixes the material to be laminated within the housing space;
wherein the shuttle comprises a first exhaust connector that exhausts the housing space by means of the exhaust device and by being connected to the first exhaust port when the jig for fixing material to be laminated is loaded on the shuttle;
wherein the intermediate table comprises a second exhaust connector that exhausts the housing space by means of the exhaust device and that is connected to the second exhaust port when the jig for fixing material to be laminated is loaded on the intermediate table; and
wherein the transporting device transports the jig for fixing material to be laminated toward the pressurizing device while the jig for fixing material to be laminated is placed on the shuttle and the housing space is being exhausted by means of the first exhaust connector, and then transfers the jig for fixing material to be laminated to the intermediate table of the transporting device, which intermediate table is disposed downstream in the direction of the transport, whereupon on the intermediate table, after the second exhaust connector is connected to the second exhaust port, the housing space is exhausted by the exhaust device by the exhaust passage being switched to the second exhaust port, such that the jig for fixing material to be laminated is transported while the housing space for the jig for fixing material to be laminated is kept to be in an exhausted condition.

2. The apparatus of claim 1, wherein the pressurizing device comprises a plurality of pressurizing parts; a shuttle and an intermediate table are provided corresponding to each of the plurality of pressurizing parts; a plurality of the shuttles of the transporting device are arranged to operate in a coordinated movement; a shuttle receives the jig for fixing material to be laminated that is disposed on a preceding intermediate table transports it while the housing space is maintained being exhausted by the first exhaust connector, and then transfers it to an adjacent intermediate table that is positioned on the downstream side.

3. The apparatus of claim 1, wherein the pressurizing device pressurizes an object to be pressurized while it transports the object in a straight line, wherein the transporting device transports the jig for fixing material to be laminated in a straight line and wherein pressurizing the jig for fixing material to be laminated is carried out while the jig for fixing material to be laminated is being transported by the transporting device.

4. The apparatus of claim 3, wherein while the jig for fixing material to be laminated is pressurized by the pressurizing device, the transporting device transports the jig for fixing material to be laminated at a speed that corresponds to a feeding speed of the pressurizing device.

5. The apparatus of claim 1, wherein at least either a crank-slider transporting device comprising the slider and shuttle or the intermediate table, of the transporting device, has a lifting device, where the jig for fixing material to be laminated is transferred by a movement of either the crank-slider transporting device or the intermediate table that goes up or down relatively to the other in relation to a base of a surface of the jig for fixing material to be laminated that is pressurized by the pressurizing device.

6. The apparatus of claim 1, wherein the first exhaust port and the second exhaust port each comprise a check valve that prevents outside air from flowing back into the housing space.

7. The apparatus of claim 4, wherein the slider comprises a crank-arm, one end of which is connected to the driving device that makes a rotating movement and which crank-arm can rotate, and a link, one end of which is connected to an other end of the crank-arm in a way that both ends can rotate, and a guide rail that guides, in the direction of the transport, the shuttle to move, one end of which is connected to an other end of the link that moves the shuttle back and forth.

8. The apparatus of claim 7, wherein a transporting speed of the jig for fixing material to be laminated that is transported by the transporting device is controlled based on the angular velocity that is calculated, of an angle of the crank-arm that rotates.

9. A transport method for transporting a jig for fixing material to be laminated for an apparatus for manufacturing bonded laminated material that manufactures the bonded laminated material by pressurizing material to be laminated made of laminated membranes by means of a pressurizing device, which transporting method transports the jig for fixing material to be laminated while fixing the material to be laminated, wherein the method uses:
- an exhaust device that can be connected to the jig for fixing material to be laminated;
- a transporting device that transports the jig for fixing material to be laminated while fixing the material to be laminated comprising:
  - a shuttle that carries the jig for fixing material to be laminated;
  - a slider that causes the shuttle to make a reciprocating movement along a transporting direction;
  - a driving device that drives the slider;
  - an intermediate table that receives the jig for fixing material to be laminated from the shuttle and holds it;
- wherein the jig for fixing material to be laminated comprises:
  - a housing space that can house material to be laminated;
  - an exhaust passage that is connected to the housing space;
  - a first exhaust port and a second exhaust port that can alternately be switched to the exhaust passage that connects the housing space and the exhaust device;
- wherein, when the material to be laminated is disposed in the housing space and the space is exhausted by the exhaust device, the jig for fixing material to be laminated fixes the material to be laminated to the housing space;
- wherein the method comprises the steps of:
  - transporting the jig for fixing material to be laminated from an upstream side of the pressurizing device toward the pressurizing device while the housing space is in the state of being exhausted by means of the first exhaust port; and
  - transferring the jig for fixing material to be laminated that was transported toward the pressurizing device to the intermediate table of the transporting device, which intermediate table is downstream in the direction of the transport, and exhausting the housing space by means of the second exhaust port after an exhaust connector on the intermediate table is connected to the second exhaust port.

10. The transport method for transporting a jig for fixing material to be laminated of claim 9, wherein the pressurizing device pressurizes an object while it transports the object in a straight line, the method comprises further a step where the transporting device transports the jig for fixing material to be laminated at a speed that corresponds to a feeding speed of the pressurizing device while the jig for fixing material to be laminated is pressurized by the pressurizing device.

* * * * *